United States Patent
Garcelon et al.

(10) Patent No.: US 7,907,607 B2
(45) Date of Patent: Mar. 15, 2011

(54) SOFTWARE METHODS OF AN OPTICAL NETWORKING APPARATUS WITH INTEGRATED MODULES HAVING MULTI-PROTOCOL PROCESSORS AND PHYSICAL LAYER COMPONENTS

(75) Inventors: Robert C. Garcelon, Portland, OR (US); Alfred C. She, Beaverton, OR (US); Steven R. Ringwald, Hillsboro, OR (US)

(73) Assignee: Null Networks LLC, Las Vegas, NV (US)

( * ) Notice: Subject to any disclaimer, the term of this patent is extended or adjusted under 35 U.S.C. 154(b) by 2279 days.

(21) Appl. No.: 10/211,002

(22) Filed: Aug. 2, 2002

(65) Prior Publication Data

US 2004/0024858 A1    Feb. 5, 2004

(51) Int. Cl.
*H04L 12/28*    (2006.01)
*H04L 12/56*    (2006.01)
*G06F 15/173*    (2006.01)

(52) U.S. Cl. .................. 370/389; 370/419; 709/223

(58) Field of Classification Search .......... 370/351, 370/389, 419; 709/223, 224, 225
See application file for complete search history.

(56) References Cited

U.S. PATENT DOCUMENTS

| | | | |
|---|---|---|---|
| 5,574,903 A | 11/1996 | Szymanski et al. | |
| 5,630,061 A | 5/1997 | Richter et al. | |
| 6,567,413 B1 | 5/2003 | Denton et al. | |
| 6,567,419 B1 | 5/2003 | Yarlagadda et al. | |
| 6,580,731 B1 | 6/2003 | Denton | |
| 6,604,136 B1 * | 8/2003 | Chang et al. .......... | 709/223 |
| 6,981,027 B1 * | 12/2005 | Gallo et al. .......... | 709/216 |
| 6,996,833 B1 | 2/2006 | Olson et al. | |
| 7,002,967 B2 | 2/2006 | Denton et al. | |
| 7,130,948 B2 | 10/2006 | Bian et al. | |
| 7,320,132 B2 | 1/2008 | Garcelon | |
| 2002/0049930 A1 | 4/2002 | Hannigan | |
| 2002/0091863 A1 | 7/2002 | Schug | |
| 2002/0138664 A1 * | 9/2002 | Blott et al. .......... | 709/328 |
| 2003/0145129 A1 * | 7/2003 | Nagalkar .......... | 709/321 |
| 2003/0163555 A1 * | 8/2003 | Battou et al. .......... | 709/223 |
| 2003/0188026 A1 | 10/2003 | Denton et al. | |

(Continued)

FOREIGN PATENT DOCUMENTS

WO    02095511    11/2002

(Continued)

OTHER PUBLICATIONS

Office Action, issued in U.S. Appl. No. 10/210,989, mailed Jun. 22, 2006.

(Continued)

*Primary Examiner* — Chirag G Shah
*Assistant Examiner* — Srinivasa R Reddivalam
(74) *Attorney, Agent, or Firm* — Schwabe, Williamson & Wyatt, P.C.

(57) ABSTRACT

A unified API is provided to an optical networking apparatus to facilitate uniform access, control or interaction with its multi-protocol optical networking modules (MPONM) by its applications. Each of the MPONM has a multi-protocol processor with a number of function blocks and physical layer components. Corresponding service routines are provided for the function blocks and the physical layer. Functions of the function block/physical layer service routines are externalized through the same unified API, thereby enabling accesses and interactions with physical layer components of a MPONM to be conducted in the same high level manner as accesses and interactions with function blocks of the multi-protocol processor of the MPONM.

40 Claims, 8 Drawing Sheets

U.S. PATENT DOCUMENTS

| | | | |
|---|---|---|---|
| 2003/0237047 A1* | 12/2003 | Borson | 715/513 |
| 2004/0022251 A1 | 2/2004 | Garcelon | |
| 2004/0022259 A1 | 2/2004 | Tuchow | |
| 2004/0024857 A1 | 2/2004 | Cai | |
| 2004/0024858 A1 | 2/2004 | Garcelon et al. | |
| 2004/0024938 A1 | 2/2004 | Bian et al. | |
| 2004/0057390 A1 | 3/2004 | Boleyn et al. | |

FOREIGN PATENT DOCUMENTS

| | | |
|---|---|---|
| WO | 02096001 | 11/2002 |

OTHER PUBLICATIONS

Office Action, issued in U.S. Appl. No. 10/210,989, mailed Dec. 4, 2006.

Office Action, issued in U.S. Appl. No. 10/210,989, mailed Feb. 27, 2007.

Examiner's Answer, issued in U.S. Appl. No. 10/210,989, mailed Nov. 16, 2007.

Examiner's Answer, issued in U.S. Appl. No. 10/210,989, mailed Jan. 25, 2010.

Office Action, issued in U.S. Appl. No. 10/211,005, mailed Dec. 13, 2005.

Office Action, issued in U.S. Appl. No. 10/211,005, mailed Jul. 26, 2006.

Office Action, issued in U.S. Appl. No. 10/211,005, mailed Oct. 12, 2006.

Notice of Allowance, issued in U.S. Appl. No. 10/211,005, mailed Apr. 11, 2007.

* cited by examiner

Intra Physical Layer Inter-Component Transactions ~ 610

- Start Transaction      ~612
- Set Pin Hi / Lo        ~614
- Get Pin                ~615
- Read Status            ~616
- Send / Get Databyte    ~618
- Stop Transaction       ~620

SOFTWARE METHODS OF AN OPTICAL NETWORKING APPARATUS WITH INTEGRATED MODULES HAVING MULTI-PROTOCOL PROCESSORS AND PHYSICAL LAYER COMPONENTS

FIELD OF THE INVENTION

The present invention relates to software methods and networking apparatuses. More specifically, the present invention relates to software methods to provide uniform access, control and/or interaction with function blocks of multi-protocol processors and physical layer components of multi-protocol optical networking modules (MPONM) in an optical networking apparatus.

BACKGROUND OF THE INVENTION

With advances in integrated circuit, microprocessor, networking and communication technologies, an increasing number of devices, in particular, digital computing devices, are being networked together. Devices are often first coupled to a local area network, such as an Ethernet based office/home network. In turn, the local area networks are interconnected together through wide area networks, such as SONET networks, ATM networks, Frame Relays, and the like. Of particular importance is the TCP/IP based global inter-network, the Internet. Historically, data communication protocols specified the requirements of local/regional area networks, whereas telecommunication protocols specified the requirements of the regional/wide area networks. The rapid growth of the Internet has fueled a convergence of data communication (datacom) and telecommunication (telecom) protocols and requirements. It is increasingly important that data traffic be carried efficiently across local, regional, as well as wide area networks.

As a result of this trend of increased connectivity, an increasing number of applications that are network dependent are being deployed. Examples of these network dependent applications include but are not limited to, the world wide web, email, Internet based telephony, and various types of e-commerce and enterprise applications. The success of many content/service providers as well as commerce sites depend on high speed delivery of a large volume of data across wide areas. As a result, high speed data trafficking devices, such as high speed optical, or optical-electro routers, switches and so forth, are needed.

Unfortunately, because of the multiplicity of protocols, including datacom and telecom protocols, that may be employed to traffic data in the various types of networks, designers and developers of networking components and equipment, such as line cards, routers and switchers, have to wrestle with a multitude of prior art protocol processors. Each of these protocol processors is typically dedicated to the support of either local/regional or regional/wide area protocols, in their designs of these components/equipment. This burden is costly, and slows down the advancement of high speed networks.

U.S. patent application Ser. Nos. 09/860,207 and 09/861,002, both filed on May 18, 2001, entitled "A MULTI-PROTOCOL NETWORKING PROCESSOR WITH DATA TRAFFIC SUPPORT SPANNING LOCAL, REGIONAL AND WIDE AREA", and "AN OPTICAL NETWORKING MODULE INCLUDING PROTOCOL PROCESSING AND UNIFIED SOFTWARE CONTROL" respectively, disclosed a novel highly flexible multi-protocol processor capable of supporting high-speed data traffic in local, regional, and wide area networks, and a multi-protocol optical networking module that can be constructed from such a multi-protocol processor. Resultantly, sophisticated optical-electrical networking apparatuses such as optical-electrical routers and switches may be built more efficiently with multiple ones of the disclosed multi-protocol optical networking module (each having its own multi-protocol processor and physical layer components).

In turn, the task for developing networking applications for such sophisticated optical-electrical networking apparatus with multiple ones of the disclosed multi-protocol optical networking module (each having its own multi-protocol processor and physical layer components) have become much more difficult. In particularly, conventionally, interactions with the multi-protocol processors and the physical layer components are made through interfaces that are very dissimilar. The later is typically at a lower bits and bytes level, while the former is at a higher variable or symbolic level.

Accordingly, a software architecture, including methods, that reduces the complexity and improves the ease for developing networking applications for such complex networking apparatuses with multiple ones of the disclosed multi-protocol optical networking module (each having its own integrated multi-protocol processor and physical layer components) is desired.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes software methods, in particular, an application programming interface (API) for networking applications to interact with function blocks of multi-protocol processors and physical layer components of MPONM of an optical-electrical networking apparatus.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as data, variables, methods, request, return, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will be described using networking terms, including but are not limited to:

| | |
|---|---|
| Egress | Outgoing data path from the system to the network |
| HDLC | High-Level Data Link Control. A communication protocol used in Packet Over SONET switching network. |
| Ingress | Incoming data path from the network to the system |
| IP | Internet Protocol |
| LAN | Local Area Network |
| MAC | Media Access Control layer, defined for Ethernet systems |
| POS | Packet Over SONET |
| PPP | Point to Point Protocol |
| SONET | Synchronous Optical NETwork, a PHY telecommunication protocol |
| WAN | Wide Area Network |

The term "physical layer components" refer to the electro optical components of a MPONM. Examples of such physical layer components include, but are not limited to, laser diodes, temperature sensors, analog-to-digital (A/D) and digital-to-analog (D/A) converters, clock sources, photo diodes, general purpose input/output interface (GPIO), serial digital I/O interfaces, and persistent storage units such as EEPROM (Electrically Erasable Programmable Read-Only-Memory).

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The phrases "comprising", "including", "having" are synonymous, unless the context dictates otherwise.

OVERVIEW

Figure 1:
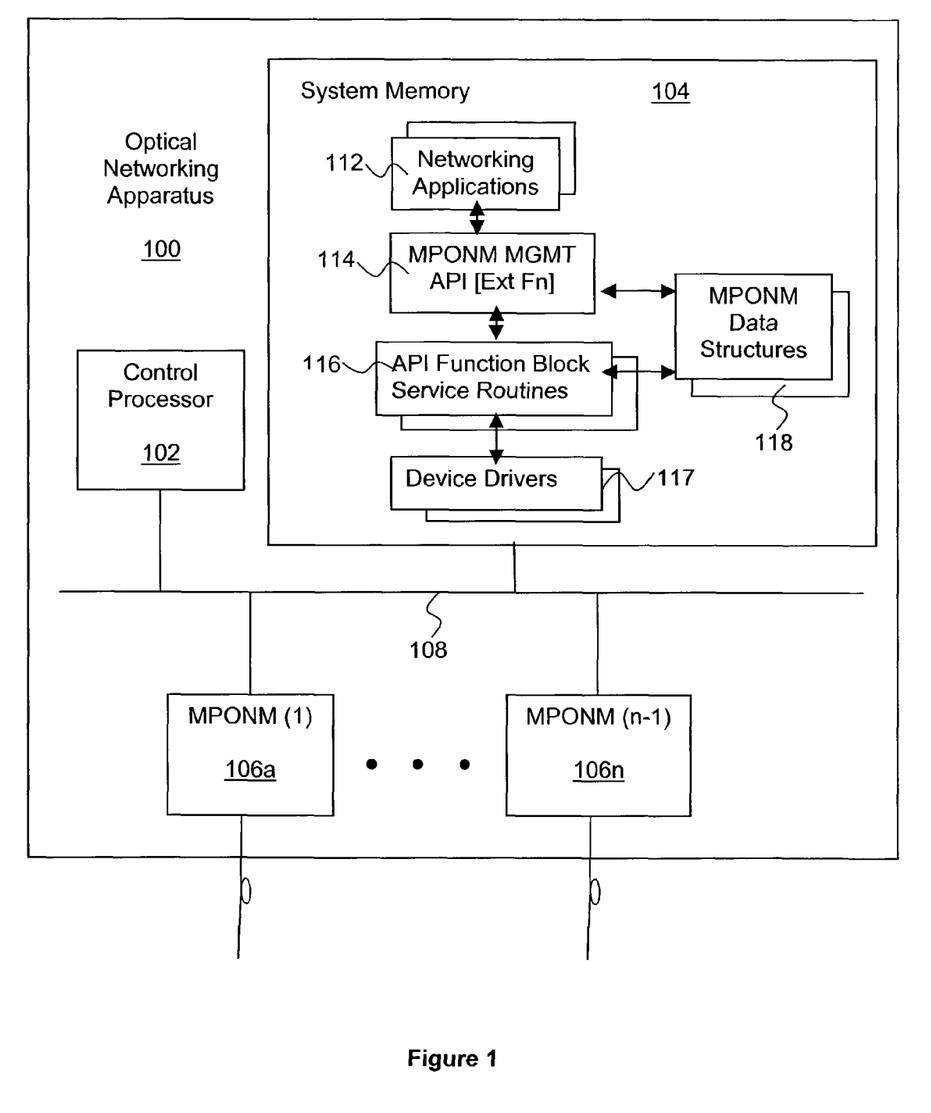
FIG. 1 illustrates an overview of the software method of present invention, including an optical-electrical networking apparatus having multiple MPONM (each integrated with a multi-protocol processor and physical layer components), within which the present invention may be practiced, in accordance with one embodiment.
Figure 5A:
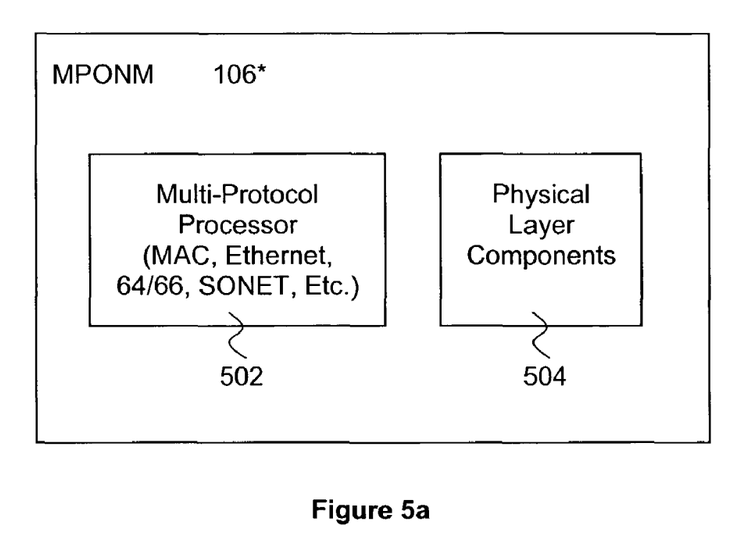
FIGS. 5a-5b illustrate the MPONM and MPONM API of FIG. 1 in further details, respectively, in accordance with one embodiment.
Figure 5B:
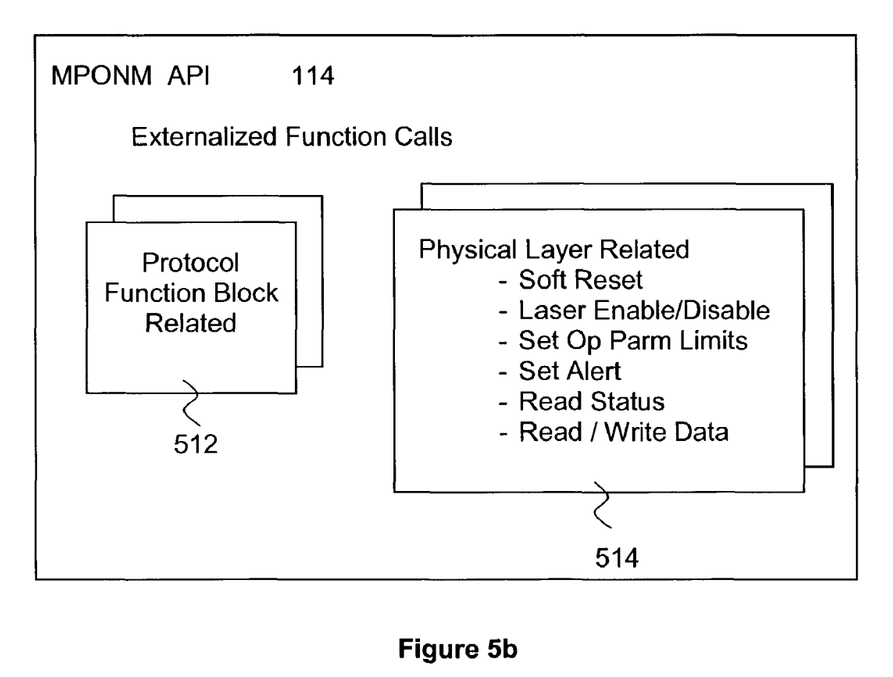

Referring now to FIG. 1 and FIGS. 5a-5b, wherein three block diagrams illustrating an overview of the software method of the present invention, in accordance with one embodiment, including an optical-electrical networking apparatus having multiple MPONM within which the present invention may be practiced, is shown. As illustrated in FIG. 1, for the embodiment, optical networking apparatus 100 includes a number of MPONM 106a-106n, a control processor 102, and memory 104, coupled to each other through system bus 108. As illustrated in more detail in FIG. 5a, each of MPONM 106a-106n includes at least one multi-protocol processor 502 having a number of function blocks, and physical layer components 504.

In various embodiments, the various MPONM 106a-106n may be connected to system bus 108 in like or different manners. For examples, all MPONM 106a-106n may be connected via corresponding serial or parallel interfaces, or some MPONM 106* are connected via corresponding serial interfaces, while others are connected via corresponding parallel or other bus interfaces.

Accordingly, for the embodiment, various device drivers 117 are provided to facilitate the various corresponding types of interfaces for connecting MPONM 106a-106n to system bus 108. That is, a serial interface oriented device driver 117 is provided to facilitate connection of some or all of MPONM 106a-106n via corresponding serial interfaces, a parallel interface oriented device driver 117 is provided to facilitate connection of some or all of MPONM 106a-106n via corresponding parallel interfaces, and so forth.

As described earlier, MPONM 106* is the subject matter of the earlier identified co-pending '002 U.S. patent application, and multi-protocol processor 502 is the subject matter of the earlier identified '207 U.S. patent application. In one embodiment, the function blocks of multi-protocol processor 502 include a system interface block, a network interface block, a MAC block, an Ethernet 64/66 coder, an Ethernet-Over-SONET coder block, a PPP protocol and HDLC processor block, a HDLC Packet Over SONET coder block, a SONET path processor block, a SONET section and line processor block, and a control interface (not separately shown). The various function blocks are selectively employed in combination to service data transmission and receipt in accordance with a selected one of a number of frame or packet based protocols, including non-synchronous packet based protocols, frame based protocols encapsulated within a synchronous protocol, as well as streaming and packet variants of the synchronous protocol. These protocols include at least one each a datacom and a telecom protocol.

Briefly, the system interface block is employed to facilitate input of egress data from the system and output of ingress data to the system from the MPONM. The MAC block is employed to perform data link sub-layer media access control processing on egress and ingress MAC data. The Ethernet 64/66 coder and Ethernet-Over-SONET Coder blocks are provided to perform physical sub-layer 64/66 and Ethernet-Over-SONET coding and decoding for the egress and ingress MAC data respectively.

The PPP/HDLC processor block is employed to perform data link sub-layer point-to-point protocol and high level data link control processing on IP, PPP, and HDLC data. The PPP/HDLC processor is employed to frame or de-frame IP and POS data, providing appropriate encapsulation or de-encapsulation, in accordance with PPP and HDLC. The HDLC POS coder block is provided to perform physical sub-layer Packet Over SONET coding and decoding for the egress and ingress HDLC data respectively.

The SONET path processor block is provided to perform path processing for "packetized" SONET data and coded frame-based data, whereas the SONET section and line processor block is provided to perform section and line processing for "packetized" as well as "streaming" SONET data. The network interface block is provided to facilitate output of egress data and input of ingress data.

The control interface is employed to facilitate interaction between the multi-protocol processor and external devices.

In one embodiment, the physical layer components include a laser, a number A/D and D/A converters, photo diodes, temperature sensors, clock source, GPIO, serial digital I/O interfaces and EEPROM. Each of these components is used to perform its conventional function known in the art.

Thus, if networking applications 112 are required to access, control or otherwise interact with each of these function blocks of each of the multi-protocol processors, and/or physical layer components of the MPONM, directly and via different approaches, the complexity, if not prohibitive, is at least not very productive for the average software developers.

Further, in one embodiment, the EEPROM, in addition to its conventional role of storing operation parameters for various physical layer components, is advantageously employed as a persistent store for operational data of the various function blocks of the companion multi-protocol processor 502. Resultantly, the needs and frequencies for networking applications 112 to access the EEPROM are significantly higher than prior art arrangements, which in turn increases the need to improve the ease for networking applications 112 to access the physical layer components, in particular, the embedded EEPROM.

Accordingly, under the present invention, MPONM API 114 with externalized function block/physical layer function calls, and function block/physical layer service routines 116, are provided for interfacing with corresponding ones of the function blocks of the multi-protocol processors and the physical layer components of the MPONM 106*.

Further, as illustrated in FIG. 5b these service routines 116, or more specifically, their externalized callable functions 512-514, are accessed through unified MPONM API 114, thereby insulating networking applications 112 from the complexity of the function blocks of the multi-protocol processors and the physical layer components of the MPONM 106*.

For the embodiment, unified MPONM API 114 further includes at least a module initialization function (not separately shown), to be described in more detail below.

Moreover, because MPONM API 114 is a unified API for accessing and interacting with the function blocks of multi-protocol processor 502 as well as physical layer components 504 of the MPONM 106*, i.e. via the same higher symbolic level of interactions, accesses and interactions with physical layer components 504 of the MPONM 106* are further simplified for networking applications 112.

For the embodiment illustrated in FIG. 5b, the externalized higher level function calls supported by the corresponding physical layer service routines 116 include, but are not limited to, a function call to place the physical layer of a MPONM 106* in a soft reset state,
a function call to enable or disable a laser in the physical layer of a MPONM 106*,
a function call to set the upper and/or lower limit of an operating parameter of a component of the physical layer of a MPONM 106*,
a function call to specify an alert to be generated when an upper and/or lower limit of an operating parameter of a component the physical layer of a MPONM 106* is exceeded,
a function call to read a status of a signal of a component of the physical layer of a MPONM 106*, and
a function call to read/write an amount of data into a register or a storage location of a physical layer component of a MPONM 106*.

The term "externalized" is used in the current context from the visibility perspective of networking applications 112 for ease of understanding. Such characterization has no significance as to the essence of the present invention.

Except for unified MPONM API 114, including the externalized physical layer related function calls and the module initialization function, the teachings of the present invention incorporated with function block/physical layer service routines 116, and the manner networking applications 112 and function block/physical layer service routines 116 cooperate with unified MPONM API 114, networking applications 112 and function block/physical layer service routines 116 otherwise represent a broad range of such elements known in the art, and are typically application dependent. Accordingly, except for the manner networking applications 112 and function block/physical layer service routines 116 cooperate with unified MPONM API 114, these elements will not be otherwise further described.

[The asterisk at the end of a reference number denotes a "wild card", representing any of the trailing suffixes of the reference numbers employed in a figure. For example, 106* stands for 106a, 106b or any one of the other 106 references of FIG. 1.]

Networking Applications

Figure 2A:
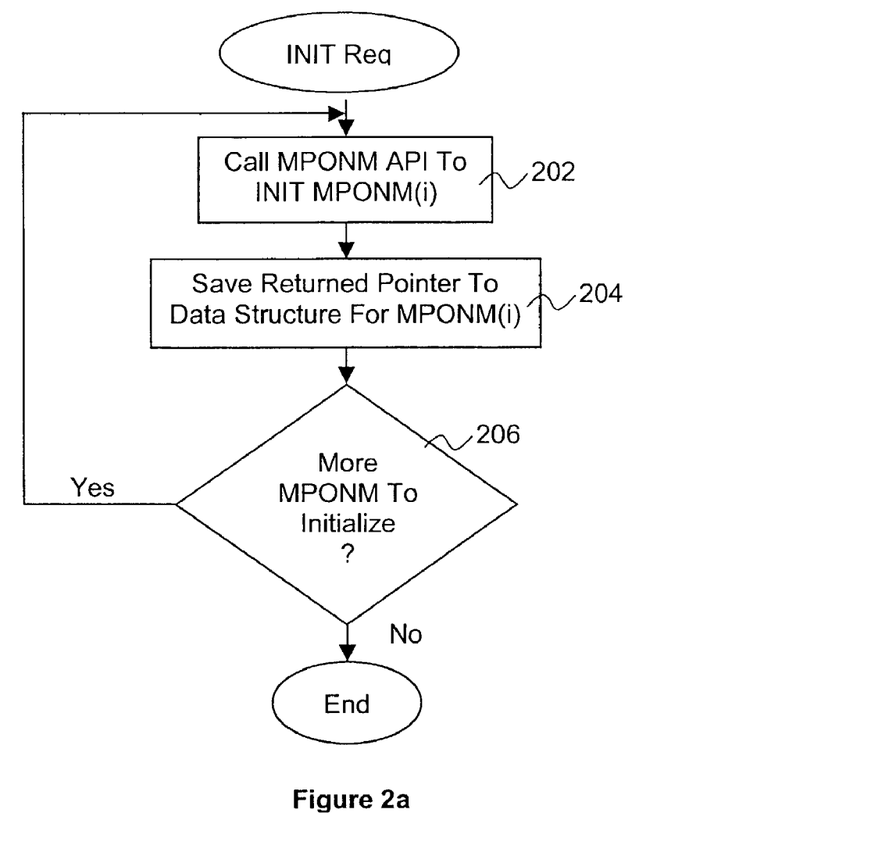
FIGS. 2a-2b illustrate the operational flow of the relevant aspects of a networking application of FIG. 1 interacting with the MPONM API of the present invention, to access, control and/or otherwise interact with the function blocks of the multi-protocol processor and physical layer components of the MPONM, in accordance with one embodiment.
Figure 2B:
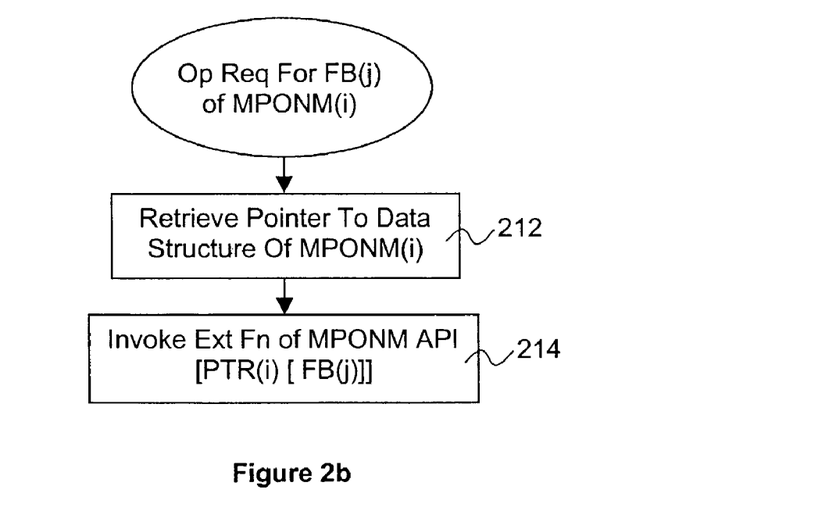

FIGS. 2a-2b illustrate the operating flow of the relevant aspects of networking applications 112 for practicing the present invention, in accordance with one embodiment. As illustrated in FIG. 2a, under the present invention, i.e. with the provision of unified MPONM API 114 including a module initialization function, at initialization or a subsequent point in time at the desire of a networking application 112, the networking application 112 first invokes the module initialization function of unified MPOMN API 114 to initialize a desired MPONM 106 it wants to subsequently access, control or otherwise interact with, block 202.

In one embodiment, networking application 112 identifies the particular MPONM 106* by providing the "handle" of the device driver 117 handling the connecting interface through which the particular MPONM 106* is connected to bus 108, and if applicable, information (such as memory mapped addresses, port numbers and so forth) associated with how the particular MPONM 106* is mapped on the connecting interface.

As will be described in more detail below, in response, the module initialization function of unified MPONM API 114, in conjunction with the function block/physical layer service routines 116, advantageously creates an instance of a MPONM structure 118 for the desired MPONM 106* to be initialized (if the module data structure 118 has not been previously created for the MPONM 106*) to facilitate subsequent access, control and/or interaction with the MPOMN 106* by networking applications 112. As part of the process, a handle to the module data structure 118 for the MPONM 106* is returned. More specifically, in one embodiment, the "handle" is a pointer to the data structure 118 of the MPONM 106*.

Thus, as illustrated, networking application 112 saves the returned handle (or pointer) to the module data structure 118 for the MPONM 106, upon receipt of the handle (or pointer) from the initialization function of unified MPONM API 114.

Thereafter, networking application 112 determines if another MPONM 106 is to be initialized, block 206. If so, operations 202-204 are repeated; else the initialization process for networking application 112 continues and proceeds to completion.

In other embodiments, the module initialization function may support each initialization request requesting initialization of one or more desired MPONM 106* instead. For these embodiments, more than one desired MPONM 106* may be specified in a single request, with the request returning multiple corresponding handles (or pointers) for the successfully initialized ones of the requested MPONM 106*.

As illustrated in FIG. 2b, upon having a need to request a service or having an operation performed in a function block/physical layer of a MPONM 106*, networking application 112 retrieves the handle (or pointer) to the module data structure 118 of the MPONM 106*, block 212, formats, and submits the request to an appropriate one of the functions of service routines 116 externalized through unified MPONM API 114. Thus, each request is directed towards a function block or the physical layer, within which the requested operation is to be performed. However, the implicit reference to a function block or the physical layer is not particularized to a MPONM 106*; and neither is an identification of the MPONM 106* provided. Instead, the MPONM 106* within which an identified function block or physical layer the requested operation is to be performed is implicitly identified. More specifically, for efficiency of operation, the handle (or pointer) of the module data structure 118 of the MPONM 106 is provided.

As those skilled in the art would appreciate, the implicit reference through the handle or pointer of the module data structure 118 of the MPONM 106* of interest, improves the ease of the use for the software developers of networking applications 112, who are more used to working with handles/pointers, as opposed to having to be cognizant of specific hardware modules, and hardware details, including the details of the connection interfaces through which the MPONM 106* are correspondingly connected.

Further, as will be described in more detail below, whether the access, control or interaction is made with a function block of the multi-protocol processor 502 or one or more components of the physical layer 504 of a MPONM 106*, networking application 112 may request the operation to be performed in the same manner, i.e. by invoking an externalized function of unified MPONM API 114.

Resultantly, the complexity for developing networking applications 112 that involve access, control and/or otherwise interact with physical layer components 504 of a MPONM 106* is significantly reduced.

Module Data Structure

Figure 3:
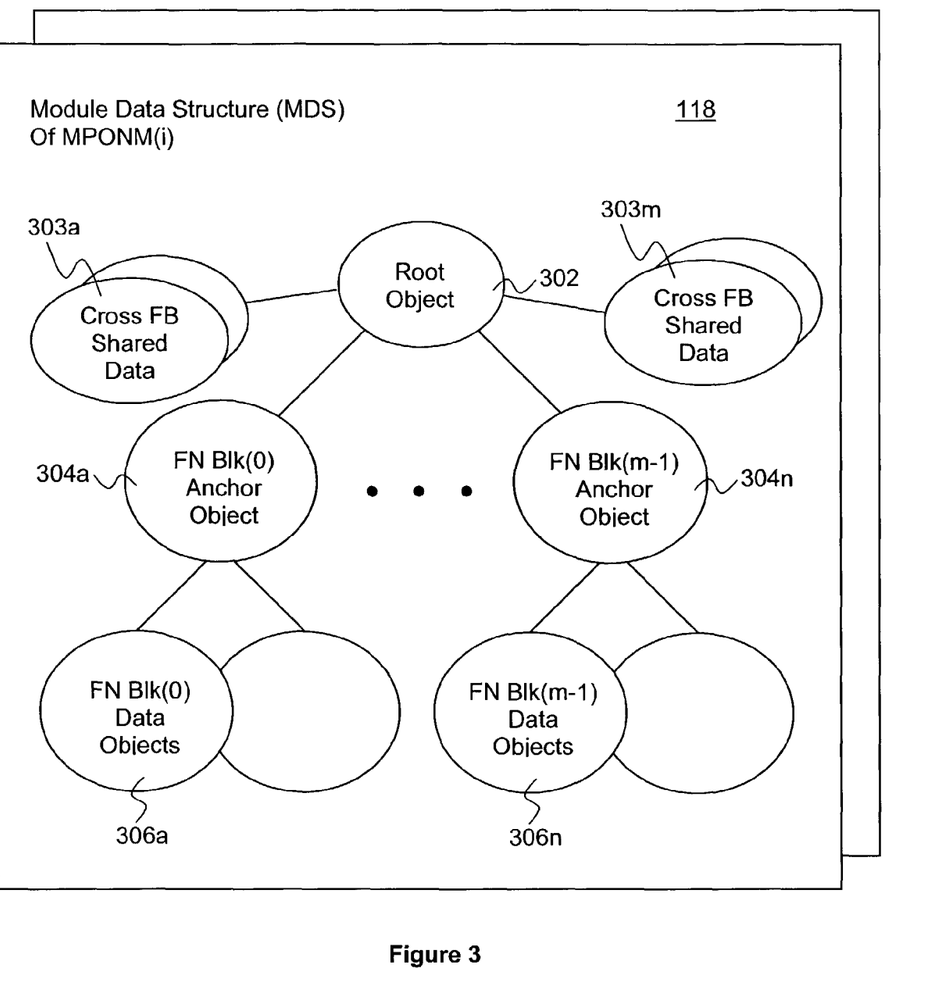
FIG. 3 illustrates the corresponding module data structures of the MPONM, employed to practice the present invention, in further detail, in accordance with one embodiment.

FIG. 3 illustrates an exemplary data organization suitable for use to practice the present invention, in accordance with one embodiment. As illustrated, for the embodiment, data structures 118 employed to facilitate the practice of the present invention are implemented in an object oriented manner. As described earlier, one data structure 118 is employed for each MPONM 106.

As illustrated, each data structure 118 includes a root object 302 and cross function block/physical layer objects 303* having cross function block/physical layer shared data variables. Examples of data included in root object 302 include but are not limited to data and/or pointers employed in interacting with the appropriate device driver 117 for the particular MPONM 106*. Examples of such cross function/physical layer shared data block variables include a module identifier, registers for putting data into and getting data out of selected ones of the function blocks/physical layer of the MPONM 106*.

Additionally, each module data structure 118 includes a number of "anchor" data objects 304*, one each for the function blocks/physical layer supported. "Anchor" data objects 304* may include a number of function block/physical layer specific control data variables. Examples of such function block/physical layer specific control data variables include status variables denoting e.g. whether the corresponding function block/physical layer service routine 116 was successful in performing certain requested operations, and data structure that serves as an index into the contents of an EEPROM of the physical layer components.

Further, attached with each "anchor" data objects 304* of the function blocks/physical layer are function block/physical layer specific data objects 306*, having function block/physical layer specific operational data variables. Examples of such function block/physical layer specific operational data variables include, but are not limited to, bit masks, data rates, filter criteria, transmit (TX) and receive (RX) optical power, TX laser bias current, TX laser modulation current, TX laser temperature, laser on/off state, and so forth.

In alternate embodiments, the present invention may be practiced using other data organization approaches.

Module Initialization Function

Figure 4:
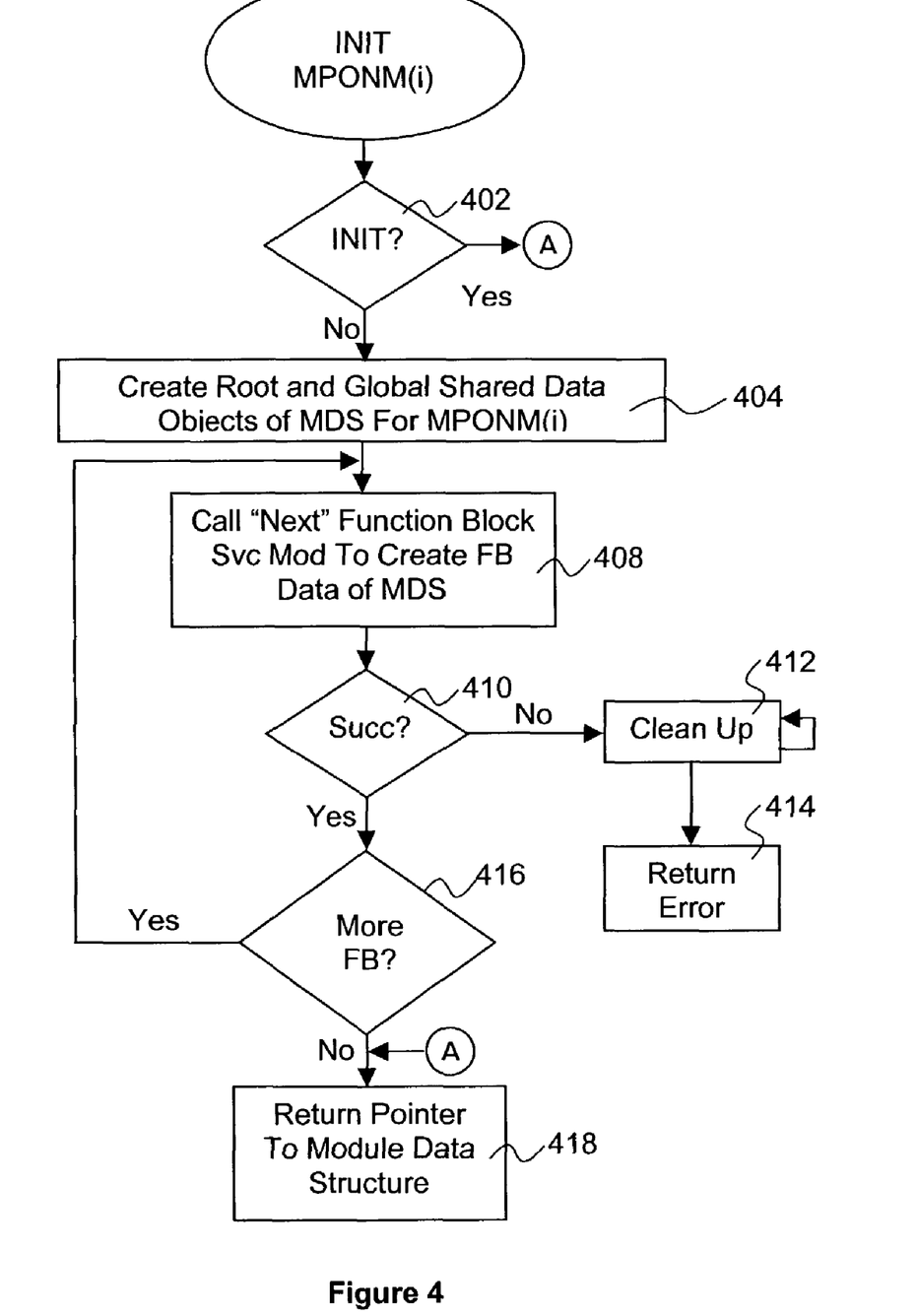
FIG. 4 illustrates the operational flow of the relevant aspects of a module initialization function of the MPONM API of the present invention, in accordance with one embodiment each.

FIG. 4 illustrates the operating flow of the relevant aspects of the module initialization function of unified MPONM API 114 for practicing the present invention, in accordance with one embodiment.

As illustrated, for the embodiment, upon receipt of a request to initialize a MPONM 106*, the module initialization function of unified MPONM API 114 determines if the MPONM 106* has previously been initialized before, block 402. More specifically, the initialization function determines whether the module data structure 118 of the MPONM 106* has previously been created or not (e.g. as a result of responding to another initialization request for the same MPONM 106 by the same or another networking application 112). If so, the module initialization function returns the handle/pointer of the data structure 118 of the MPONM 106 immediately, block 418.

Otherwise, i.e. if the module data structure 118 has not been previously created before, the module initialization function creates the root object and global cross function block/physical layer objects 302-303* of the module data structure 118 of the MPONM 106, block 404.

Thereafter, the module initialization function successively calls the corresponding function block/physical layer service routines 116 of the function blocks and physical layer component collections to contribute to the creation of data structure 118 (including anchor and function block specific data objects 304* and 306*) to facilitate subsequent access, control or interaction with MPONM 106* by networking applications 112, block 408.

For the embodiment, after each invocation, the initialization function further determines if the contributory creation expected of the invoked function block/physical layer service routine is successful, block 410. If an error is returned for the contributory creation, the initialization function successively undoes all prior successful additions to the data structure 118, block 412, and returns an error notice to the network application 112, block 414.

If the contributory creation was determined to be successful at block 410, the initialization function further determines if additional function block/physical layer service routines 116 are to be invoked, block 416. If at least one additional function block/physical layer service routines 116 is to be invoked, the initialization function continues operation at block 408 as earlier described.

If not, the cooperative creation initialization process is completed, and the initialization function returns the handle/pointer of the data structure 118 of MPONM 106* as earlier described, block 418.

Thereafter, when a need to have an operation performed within a function block of the multi-protocol processor or the physical layer (of a MPONM 106*) arises, in like manner, the applicable externalized function of the service routine is invoked without explicitly identifying the MPOPNM 106*, only the working data structure 118 of the MPONM 106*. Resultantly, accessing, controlling or otherwise interacting with MPONM 106* by networking applications 112 is streamlined.

Note that as alluded to earlier, the exact manner a function block/physical layer service routine 116 contributes in the creation of the data structure of a MPONM 106*, i.e. the kind of data variables the function block/physical layer service routine 116 adds to, maintains, or otherwise manipulates, using data structure 118 is application dependent. Similarly, the nature and the manner the function block/physical layer service routine 116 interacts with the MPONM 106* in particular a function block of its multi-protocol processor or its physical layer components, are application dependent. They vary from function block to function block, or in the nature of the components.

Further, in various embodiments, invocation of the function block service routines 116 to contribute to the creation of the module data structure 118 may be made in a predetermined order, to address certain application dependencies, such as data dependencies between data of different function blocks.

Physical Layer Architecture, Transactions and Transaction Flow

Figure 6A:
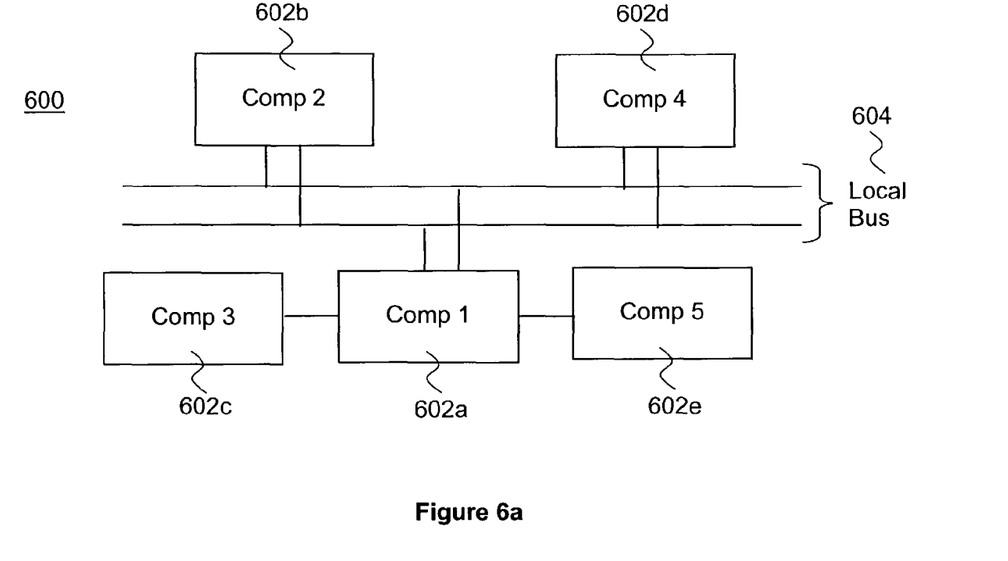
FIGS. 6a-6c illustrate an exemplary architecture for coupling physical layer components, including the use of a local use, intra physical layer component transactions and transaction flow, respectively, in accordance with one embodiment.
Figure 6B:
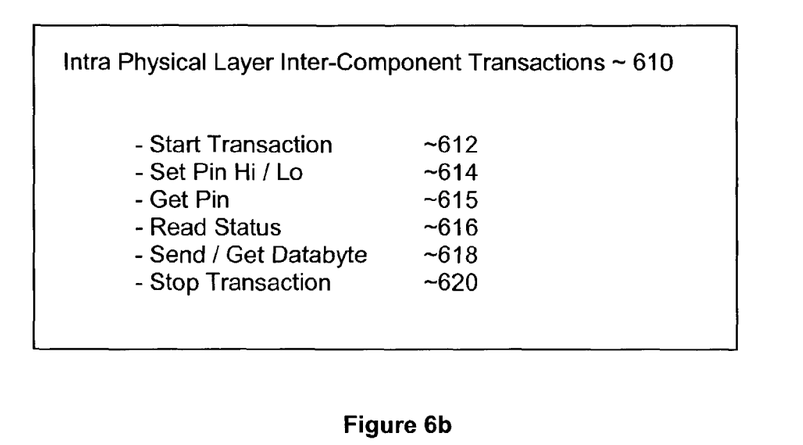
Figure 6C:
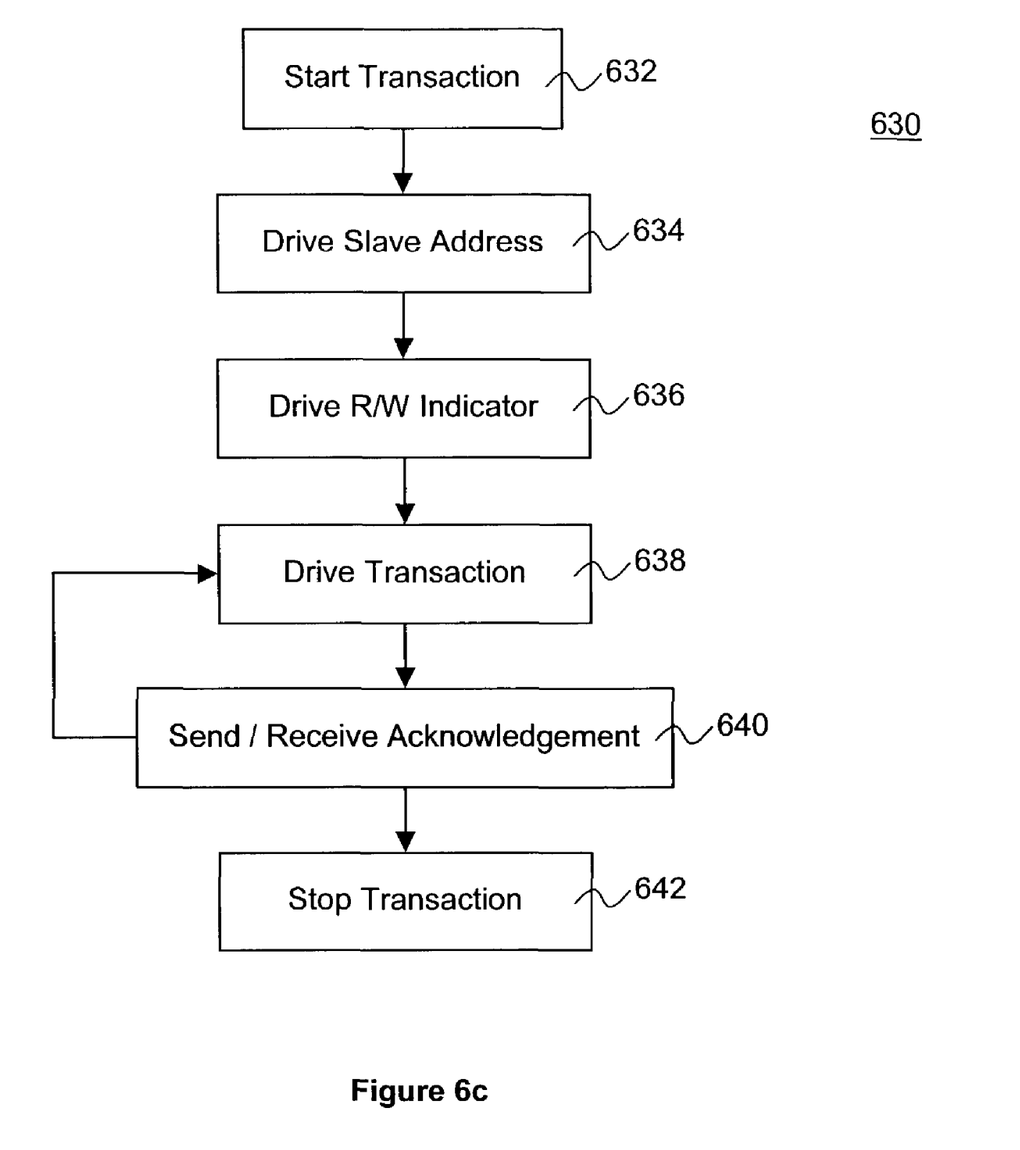

Referring now to FIGS. 6a-6c, wherein three block diagrams illustrating an exemplary physical layer architecture, exemplary intra physical layer inter-component transactions, and an exemplary transaction flow, for a MPONM, in accordance with one embodiment each, are shown.

As illustrated in FIG. 6a, for the embodiment, selected ones of physical layer components 602a-602e of a MPONM 106* are coupled to each other directly, 602a, 602c and 602e, and via a local bus 604, 602b and 602d. As described earlier, physical layer components 602a-602e may include one or more of a laser, a number A/D and D/A converters, photo diodes, temperature sensors, clock, GPIO, serial digital I/O interface, EEPROM, and so forth. For the embodiment, physical layer components 602a-602e include in particular, a local microcontroller.

An example of local bus 604 is the well-known I2C two-wire bus. In alternate embodiments, other local buses such as the Serial Peripheral Interface (SPI) bus, the Universal Serial Bus (USB), or the ISA bus may be employed instead.

For the embodiment, intra physical layer inter component transactions 610 include
- Start transaction 612 to start a transaction with an attached component 602*,
- Set Pin transaction 614 to set a pin of one of the components 602* to a high or a low state,
- Get Pin transaction 615 to read a pin of one of the components 602* to determine whether the pin is in a high or a low state,
- Read Status transaction 616 to read a status of a registered parameter of one of the components 602*,
- Read/Write transaction 618 to read/write a data byte into a register or a storage location of one of the components 602*, and
- Stop transaction 620 to stop a transaction with an attached component 602*.

Implementations of these individual exemplary transactions 612-620 are component and/or bus dependent, and within the ability of those ordinarily skilled in the art, accordingly will not be further described.

In alternate embodiments, the present invention may be practiced with the physical layer having more or less transactions for the various components 602a-602e to interact.

FIG. 6c illustrates an example transaction flow between two physical layer components coupled to each other over local bus 604. As illustrated, for the example transaction flow, a first component of the physical layer of a MPONM 106* (such as a microcontroller), to transact with another component (e.g. to set the an operating parameter of the other component), first uses the "start transaction" 612 to place local bus 604 in a "start transaction" condition, block 632. Then, the first component drives an "address" or other identifiers onto local bus 604 to identify the other component 602* with which the transaction is to be conducted, block 634.

Next, for the example transaction flow, the first component uses "set pin" 614, "get pin" 615 "read status" 616, "send/get data byte" 618 or other transaction of like kind, to drive a read/write indicator onto local bus 604, block 636, to conduct the transaction with the identified component 602*, blocks 638-640.

For the example transaction flow, each "read/write" interaction with a component 602* includes the sending/receiving of an acknowledgement. Blocks 638-640 are repeated a number of times until the entire transaction is completed. For example, the reading of a data byte is repeated 8 times to read 8 bytes out of a EEPROM of the physical layer of a MPONM 106*.

Finally, for the example transaction flow, upon completing the transactions, the first component uses "stop transaction" 620 to drive an "end of transaction" condition onto local bus 604, block 642, thereby allowing other transactions to begin.

For transactions between directly connected components, they may be conducted without at least the operation of block 634 (driving the slave address of the counterpart component onto a shared bus). For other embodiments, such transactions may also possibly be conducted without the operations of blocks 632-634 (starting and stopping transaction).

Example Operation of a Physical Layer Service Routine

Figure 7:
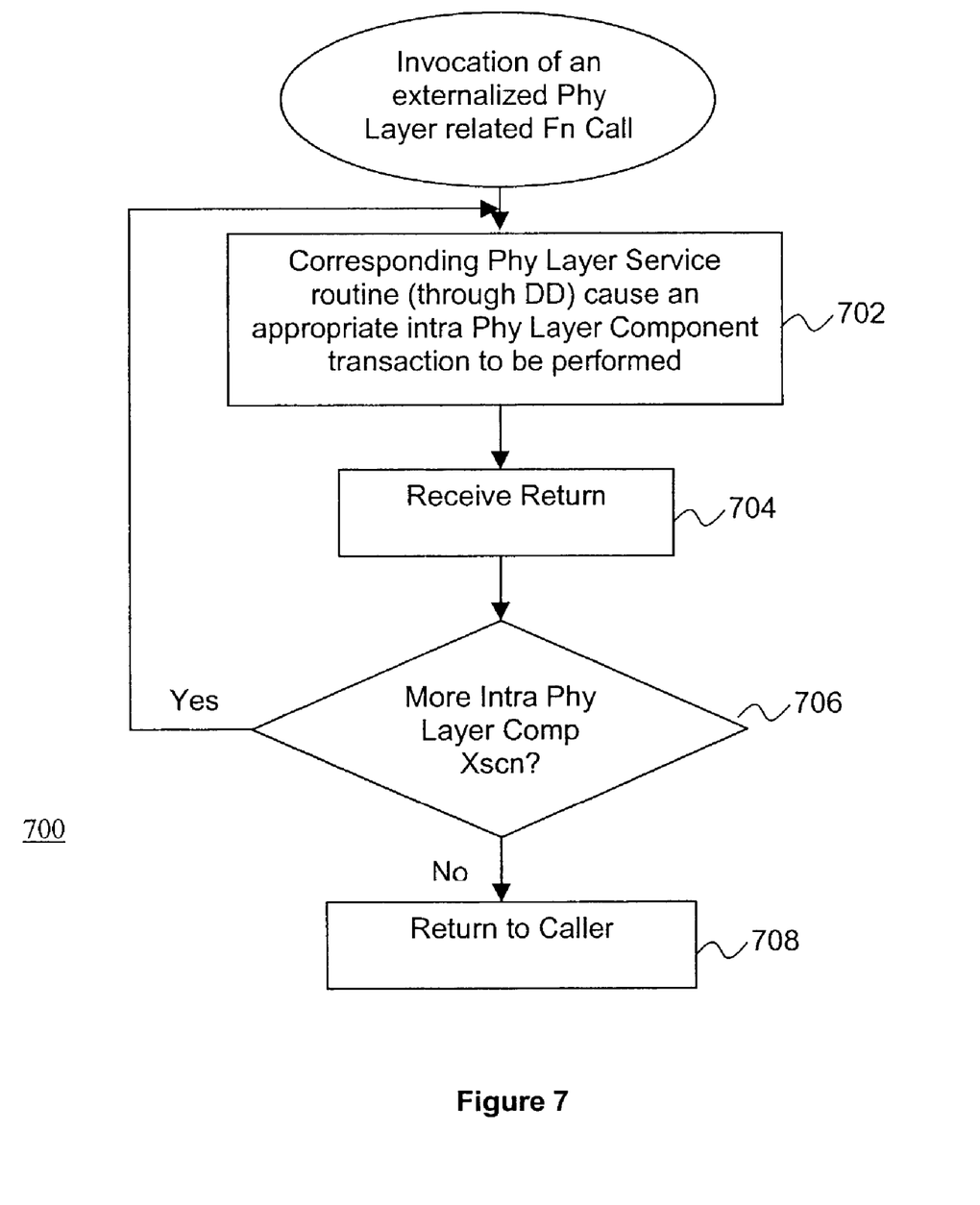
FIG. 7 illustrates a typical operational flow of a physical layer service routine of FIG. 1 in performing a requested operation on or against a physical layer component, in accordance with one embodiment.

FIG. 7 illustrates an example operational flow of a physical layer service routine 116, in accordance with one embodiment. As illustrated, upon invocation of an externalized physical layer function call (such as setting an operating limit for a physical layer component) supported by the physical layer service routine 116, the service routine 116 (through an appropriate device driver 117) causes one or more inter-physical layer component transactions be performed to effectuate the requested operation, blocks 702-706. The one or more inter-physical layer component transactions may be caused successively, with intermediate result/acknowledgement of success/failure returned from an appropriate physical layer component, block 704.

Eventually, when all required transactions to effectuate the requested operation have been successfully performed, or when a fatal error is encountered for one of the transactions to be performed, the physical layer service routine 116 returns control to the calling networking application 112. If applicable, return of control may also include one or more results of the operation and/or acknowledgement of successful/unsuccessful completion of the operation.

Accordingly, the high level functions 514 to interact with physical layer components 602* externalized through unified MPONM API 114 may be supported, achieving the desired result of insulating the complexity and dissimilar manner of interaction from developers of networking applications 112.

CONCLUSION AND EPILOGUE

Thus, it can be seen from the above descriptions, a novel highly flexible unified MPONM API equipped to streamline and improve the ease of network applications in accessing, controlling or otherwise interacting with function blocks of multi-protocol processors and physical layer components of MPONM has been described.

While the present invention has been described in terms of the above described embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In an optical networking apparatus having one or more multi-protocol optical networking modules (MPONM), each having a multi-protocol processor and a plurality of physical layer components, a method of operation comprising:
a networking application invoking a module initialization function configured to create a first and a second module data structure corresponding to each of a first and second selected ones of the one or more MPONM;
receiving by the networking application from the module initialization function, a first and a second handle pointing to the respective first and second module data structures;
saving by the networking application the first and the second handles;
retrieving by the networking application the first handle to invoke a first function of an MPONM application programming interface (API) to cause a first operation to be performed within the multi-protocol processor of the first selected one of the one or more MPONM;
retrieving by the networking application the second handle to invoke a second function of the MPONM API to cause a second operation to be performed within at least a first selected one of the physical layer components of the second selected one of the one or more MPONM; and
requesting by the networking application a third function of the MPONM API to cause a third operation to be performed, the third operation being performed within a second selected one of the physical layer components of a third selected one of the one or more MPONM, wherein the second selected one of the physical layer components of the third selected one of the one or more MPONM is a laser of the third selected one of the one or more MPONM, and wherein the third operation causes the laser to be enabled or disabled.

2. The method of claim 1, wherein the first and second selected ones of the one or more MPONM are the same MPONM.

3. The method of claim 1, wherein the method further comprises creating an instance of a data structure corresponding to the third selected one of the one or more MPONM in response to the request by the networking application.

4. The method of claim 3, wherein the second and third functions are the same function.

5. The method of claim 3, wherein the first and second selected ones of the physical layer components are the same physical layer component.

6. The method of claim 3, wherein the first and second selected ones of the one or more MPONM are the same MPONM.

7. The method of claim 1, wherein the second function causes the physical layer components of the second selected one of the one or more MPONM to be placed in a soft reset state.

8. The method of claim 1, wherein the first selected one of the physical layer components of the second selected one of the one or more MPONM is a laser of the second selected one of the one or more MPONM, and the second function causes the laser to be enabled or disabled.

9. The method of claim 1, wherein the second function causes a status of the first selected one of the physical layer components of the second selected one of the one or more MPONM to be obtained.

10. The method of claim 1, wherein the second function causes at least a selected one of an upper and a lower limit of a signal of the first selected one of the physical layer components of the second selected one of the one or more MPONM to be set.

11. The method of claim 1, wherein the second function specifies an alert when at least a selected one of an upper and a lower limit of a signal of the first selected one of the physical layer components of the second selected one of the one or more MPONM is exceeded.

12. The method of claim 1, wherein the method further comprises the second function causing a transaction to be performed between the first and a second selected one of the one or more physical layer components to be conducted.

13. The method of claim 12, wherein the method further comprises the second function starting and stopping said transaction between the first and the second selected ones of the one or more physical layer components.

14. The method of claim 12, wherein the method further comprises the second function performing a selected one of sending a data byte and reading a data byte between the first and the second selected ones of the one or more physical layer components.

15. The method of claim 12, wherein the method further comprises the second function performing a selected one of reading, setting high and setting low a pin of the first selected one of the one or more physical layer components.

16. The method of claim 1, wherein the first and the second module data structures are created if a module data structure has not been created previously for the first or the second selected ones of the one or more MPONM.

17. The method of claim 1, wherein the method further comprises the networking application requesting a third function of the MPONM API to cause a fourth operation to be performed within a second selected one of the physical layer components of a third selected one of the one or more MPONM, where the fourth operation causes the physical layer components of the third selected one of the one or more MPONM to be placed in a soft reset state.

18. The method of claim 1, wherein the method further comprises the networking application requesting a fourth function of the MPONM API to cause a fourth operation to be performed within a second selected one of the physical layer components of a third selected one of the one or more MPONM, where the fourth operation causes a status of the second selected one of the physical layer components of the third selected one of the one or more MPONM to be obtained.

19. An optical networking apparatus having one or more multi-protocol optical networking modules (MPONM), each having a multi-protocol processor and a plurality of physical layer components, the apparatus comprising:
   means for invoking a module initialization function configured to create a first and a second data structure corresponding to each of a first and second selected ones of the one or more MPONM and for receiving a first and a second handle pointing to the respective first and second data structures;
   wherein the means is further configured to:
      save the first and the second handles;
      retrieve the first handle to invoke a first function of an MPONM application programming interface (API) to cause a first operation to be performed within the multi-protocol processor of the first selected one of the one or more MPONM; and
      retrieve the second handle to invoke a second function of the MPONM API to cause a second operation to be performed within at least a first selected one of the physical layer components of the second selected one of the one or more MPONM;
   retrieve a third handle to invoke a third function of the MPONM API to cause a third operation to be performed, the third operation being performed within a second selected one of the physical layer components of a third selected one of the one or more MPONM, wherein the second selected one of the physical layer components of the third selected one of the one or more MPONM is a laser of the third selected one of the one or more MPONM, and the third operation causes the laser to be enabled or disabled; and
   bus interface means for coupling the first selected MPONM, the second selected MPONM, and the third selected MPONM to each other.

20. The apparatus of claim 19, wherein the second function includes performing a selected one of sending a data byte and reading a data byte between the first and the second selected one of the one or more physical layer components.

21. The apparatus of claim 19, wherein the second function includes performing a selected one of reading, setting high, and setting low a pin of the first selected one of the one or more physical layer components.

22. A networking apparatus comprising a plurality of multi-protocol optical networking modules (MPONM), each having a multi-protocol processor and a plurality of physical layer components, the networking apparatus comprising:
   a memory coupled to the plurality of MPONM, having stored therein a plurality of programming instructions configured to implement:
      a networking application configured to invoke a module initialization function, wherein the module initialization function is configured to create a first and a second data structure corresponding to each of a first and second selected ones of the plurality of MPONM, the first and the second data structures accessible via first and second respective handles pointing to the first and the second data structures, the first and second data structures created by the initialization function and configured to allow subsequent access and/or control by the networking application for substantially each of a requested plurality of functions of the first and the second respective selected ones of the plurality of MPONM;
      an MPONM API configured to include a first function, second function, and a third function to be invoked by the networking application, wherein the first function is configured to cause a first operation to be performed within the multi-protocol processor of the first selected one of the plurality of MPONM, the second function is configured to cause a second operation to be performed within at least a first selected one of the physical layer components of the second selected one of the plurality of MPONM, and wherein the third function is configured to cause a third operation to be performed within a second selected one of the physical layer components of a third selected one of the plurality of MPONM, wherein the second selected one of the physical layer components of the third selected one of the plurality of MPONM is a laser of the third selected MPONM, and the third operation causes the laser to be enabled or disabled; and
   at least one processor coupled to the memory and the plurality of MPONM to execute the programming instructions.

23. The apparatus of claim 22, wherein the first and second selected ones of the one or more MPONM are the same MPONM.

24. The apparatus of claim 22, wherein the second and third functions are the same function.

25. The apparatus of claim 22, wherein the first and second selected ones of the physical layer components are the same physical layer component.

26. The apparatus of claim 22, wherein the first and second selected ones of the one or more MPONM are the same MPONM.

27. The apparatus of claim 22, wherein the programming instructions implement the second function to cause the physical layer components of the second selected one of the one or more MPONM to be placed in a soft reset state.

28. The apparatus of claim 22, wherein the first selected one of the physical layer components of the second selected one of the one or more MPONM is a laser of the second selected one of the one or more MPONM, and the programming instructions implement the second function to cause the laser to be enabled or disabled.

29. The apparatus of claim 22, wherein the programming instructions implement the second function to cause a status of the first selected one of the physical layer components of the second selected one of the one or more MPONM to be obtained.

30. The apparatus of claim 22, wherein the programming instructions implement the second function to cause at least a selected one of an upper and a lower limit of a signal of the first selected one of the physical layer components of the second selected one of the one or more MPONM to be set.

31. The apparatus of claim 22, wherein the programming instructions implement the second function to specify an alert when at least a selected one of an upper and a lower limit of a signal of the first selected one of the physical layer components of the second selected one of the one or more MPONM is exceeded.

32. The apparatus of claim 22, wherein the programming instructions further implement the second function to cause a transaction to be performed between the first and a second selected one of the one or more physical layer components to be conducted.

33. The apparatus of claim 32, wherein the programming instructions implement the second function to start and stop said transaction between the first and the second selected ones of the one or more physical layer components.

34. The apparatus of claim 32, wherein the programming instructions implement the second function to perform a selected one of sending a data byte and reading a data byte between the first and the second selected ones of the one or more physical layer components.

35. The apparatus of claim 32, wherein the programming instructions implement the second function to perform a selected one of reading, setting high and setting low a pin of the first selected one of the one or more physical layer components.

36. The method of claim 1, further comprising retrieving by the networking application the first handle pointing to the first module data structure substantially each time the networking application exercises subsequent access and/or control for one of a plurality of functions in the first selected one of the one or more MPONM and retrieving by the networking application the second handle pointing to the second module data structure substantially each time the networking application exercises subsequent access and/or control for one of a plurality of functions in the second selected one of the one or more MPONM.

37. The method of claim 36, wherein retrieving by the networking application the first handle pointing to the first module data structure substantially each time the networking application exercises subsequent access and/or control for one of a plurality of functions in the first selected one of the one or more MPONM comprises retrieving by the networking application the first handle pointing to the same first module data structure.

38. The method of claim 1, wherein the first module data structure comprises a root object including a pointer configured to interact with an appropriate device driver for the first selected one of the one or more MPONM.

39. The method of claim 38, wherein the first module data structure further comprises function block shared data variables including a register for putting data into and getting data out of selected ones of the function blocks of the first selected one of the one or more MPONM.

40. The method of claim 1, wherein the first module data structure and the second module data structure include status variables denoting whether a corresponding physical layer routine was successful in performing a previously requested operation.

* * * * *

UNITED STATES PATENT AND TRADEMARK OFFICE
CERTIFICATE OF CORRECTION

PATENT NO. : 7,907,607 B2  
APPLICATION NO. : 10/211002  
DATED : March 15, 2011  
INVENTOR(S) : Robert C. Garcelon et al.

It is certified that error appears in the above-identified patent and that said Letters Patent is hereby corrected as shown below:

Claim 17, column 12, line 65, "requesting a third function" should read --requesting a fourth function--.

Claim 17, column 12, line 67, "within a second selected one" should read --within the second selected one--.

Claim 17, column 13, line 1, "components of a third selected one" should read --components of the third selected one--.

Claim 18, column 13, line 8, "within a second selected one" should read --within the second selected one--.

Claim 18, column 13, line 9, "components of a third selected one" should read --components of the third selected one--.

Claim 20, column 13, lines 50-51, "second selected one of" should read --second selected ones of--.

Claim 26, column 14, lines 39-41, should be deleted.

Signed and Sealed this  
Seventeenth Day of May, 2011

David J. Kappos  
*Director of the United States Patent and Trademark Office*